United States Patent

[11] 3,570,457

[72] Inventor Nancy L. Curtis
10 Park Ave., New York, N.Y. 10016
[21] Appl. No. 839,611
[22] Filed July 7, 1969
[45] Patented Mar. 16, 1971

[54] DOG TRAINING DEVICE
4 Claims, 8 Drawing Figs.

[52] U.S. Cl. .................................................. 119/29
[51] Int. Cl. .................................................. A01k 15/00
[50] Field of Search .................................. 119/29, 1;
119/29.5; 46/193, 111, 114

[56] References Cited
UNITED STATES PATENTS

| | | | |
|---|---|---|---|
| 3,315,640 | 4/1967 | Gamble .................... | 119/29 |
| 3,468,290 | 9/1969 | Elliott ....................... | 119/29 |
| 3,498,266 | 3/1970 | Miller ....................... | 119/29 |

Primary Examiner—Hugh R. Chamblee
Attorney—Polachek & Saulsbury

ABSTRACT: A sound emitting device for correcting behavior in dogs such as anxiety, intracability, coprophagy and the like. The device consists of a hollow cylindrical metal can with loose metal articles inside the can adapted to strike against the side and end walls of the can when the can is dropped or thrown on the floor and the like, close to where the dog is located. In a modification of the invention, the loose metal articles also strike a tuning fork mounted on the inner surface of one end wall of the can.

Patented March 16, 1971

INVENTOR
Nancy L. Curtis
By Polachek & Saulsbury
ATTORNEYS

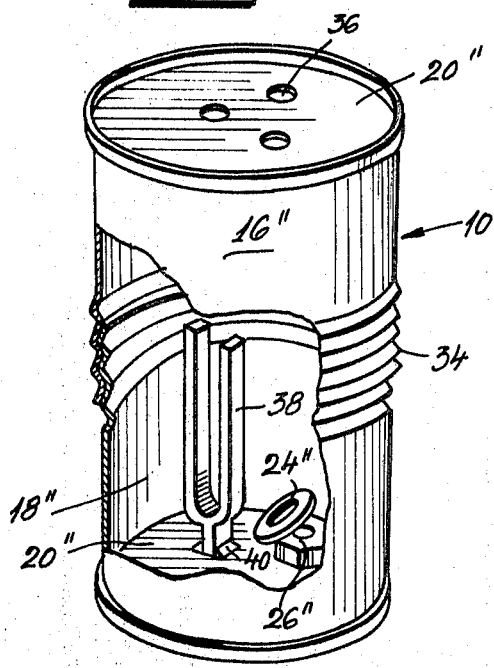
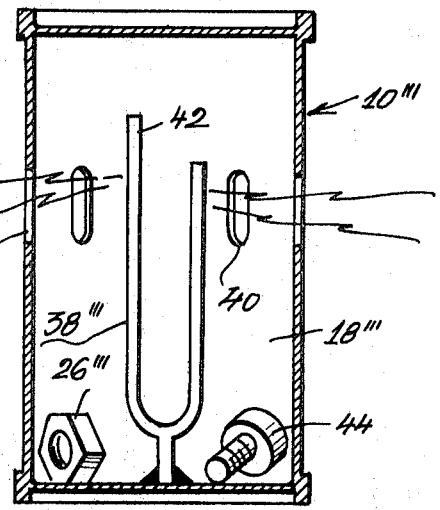
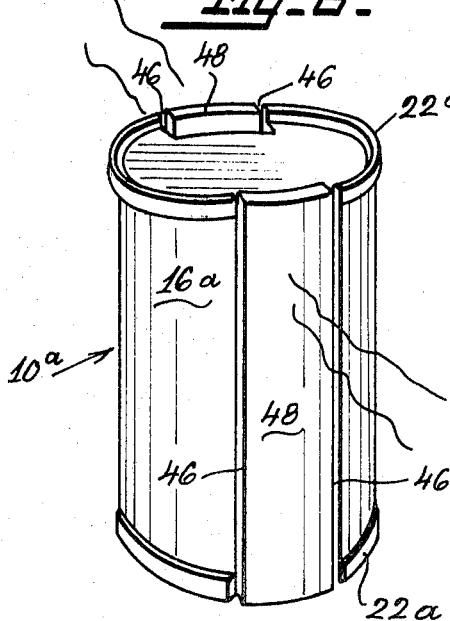
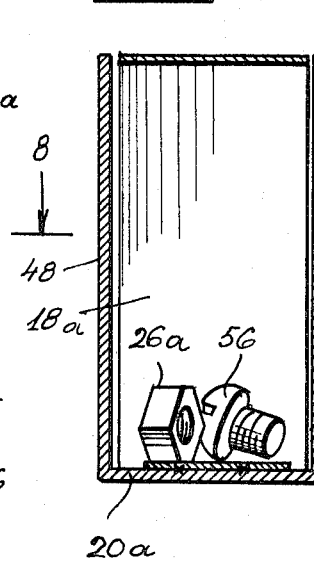
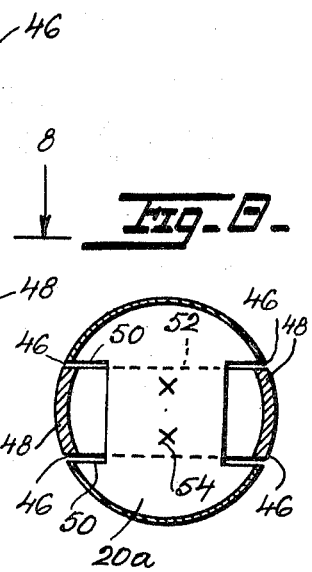
INVENTOR
Nancy L. Curtis
By Polachek & Saulsbury
ATTORNEYS

DOG TRAINING DEVICE

This invention relates to new and useful improvements in a noisemaker of learning sound device for training of dogs.

It is well known that dogs react to various noises or sound, and the present invention exploits this reaction by providing a sound device for communicating with the dog on the mental level of the dog, so that training of the dog and consequently solving its behavior problems are facilitated.

This invention was developed as a useful means of achieving a training method of communication between dog and master for reasons of housetraining, and teaching commands, without fear between dog and master.

The present invention is also highly effective in correcting bad behavior in dogs, such as destructive chewing, jumping on people, excessive barking, stealing things, howling reaction to siren, eating foreign articles, and responding to commands.

A principal object of the instant invention therefore is to provide a highly motivational sound training device that is highly effective in making corrections, the device literally ringing on the dog, like a bell and accordingly is useful for training anxiety behavior, intracability, pica, etc. without creating fear toward master.

Another object of the invention is to provide a device of this kind that can be placed for easy accessibility at strategic places in the home to facilitate rapid, immediate correction at the moment such correction is needed until the dog is fully trained.

FIG. 4 is a view similar to FIG. 2 in a sound device embodying another modified form of the invention.

FIG. 5 is a vertical sectional view through the center of a sound device embodying still another modified form of the invention.

FIG. 6 is a view similar to FIG 2 of a sound device embodying yet another form of the invention.

FIG. 7 is a vertical sectional view through the center of the sound device of FIG. 6. the FIG. 8 is a cross-sectional view taken on he plane of the line 8–8 of FIG. 7, parts being omitted.

Figure 1:
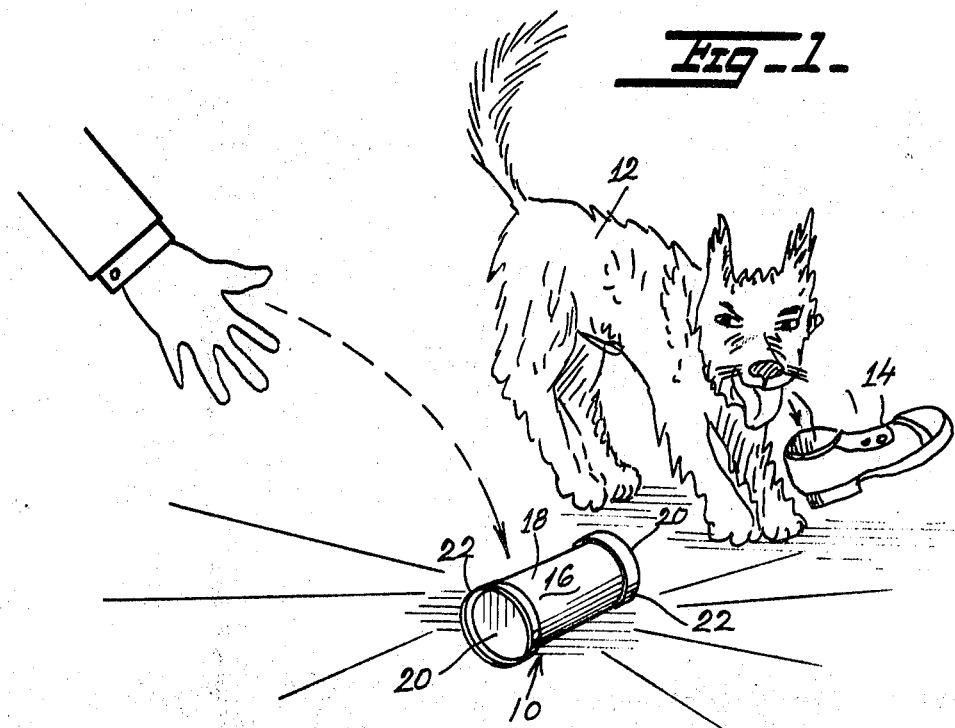
FIG. 1 is a diagrammatic perspective view showing a sound emitting device embodying the present invention being thrown on the floor to train a dog shown stealing a shoe.
Figure 2:
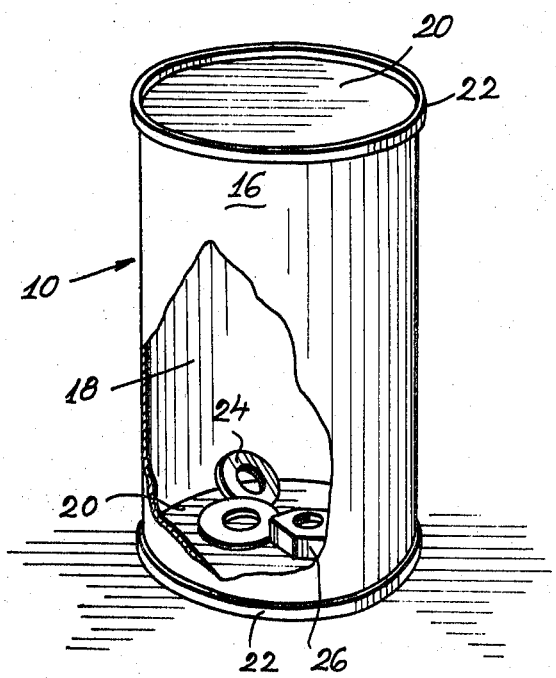
FIG. 2 is a top perspective view showing a sound emitting device embodying the present invention being thrown on the floor to train a dog shown stealing a shoe.

Referring now in detail to the various views of the drawings, in FIG. 1, a sound emitting device 10 for training dogs is shown being thrown on the floor to communicate a training sound to a dog 12 that is dropping a shoe 14 on the floor that it had stolen.

The sound emitting device 10 comprises a cylindrical hollow metal can 16 with sidewall 18 and end closure walls 20, 20 and with a bead 22 at each end. In accordance with the instant invention, a plurality of small metal articles such as metal washer 24 and metal nuts 26 (only one being shown) is sealed in the can 16.

In use, when the dog is found doing something wrong, as shown in FIG. 1, where the dog has stolen the shoe 14, the owner drops the sound device 10 on the floor, which causes the metallic articles therein to strike the sidewall and end walls of the can, thereby emitting a frustrating and strange noise or sound which is readily communicated to the dog and his mentality indicates to it that it is doing something wrong and consequently the dog the shoe. Repeated use of the sound device in this fashion, fully trains the dog to behave itself.

Figure 3:
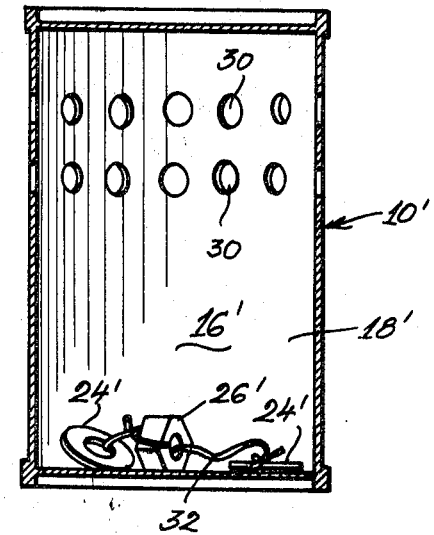
FIG. 3 is a vertical sectional view through the center of a sound device embodying the modification of the invention.

In FIG. 3 a somewhat similar sound device 10' is shown which differs from the sound device 10 merely in that several rows of spaced holes 30 are formed in the sidewall 18' of the can 16' so that the sound can more readily issue from the can. In this form of the invention, also the articles such as the washers 24' and single nut 26' are tied together by a string or wire 32.

FIG. 4 illustrates another modified form of sound device 10'' differing from sound device 10 in that the sidewall 18'' is formed with horizontally disposed corrugations 34 and the top end wall 20'' is formed with holes 36. A tuning fork 38 is secured in upright position on the bottom end wall 20'' by solder 40. A washer 24'' and a nut 26'' are shown loosely mounted on the bottom end wall 20''.

In use, when the can 16'' is thrown or dropped on the floor, the washer and nut strike the tuning fork 38 emitting a tuneful sound and also strike the sidewall 18'' and end walls of he can emitting a frustrating sound through the holes 36 in the top end wall. The corrugations strengthen the body of the can.

Still another modified form of sound device 10'' is shown in FIG. 5 which is somewhat similar to the sound device 10'' of FIG. 4 except that the sidewall 18''' is not formed with corrugations and the top end wall is not formed with holes. However, the sidewall 18''' is formed with a row of elongated closed slots 40 vertically disposed and the tuning fork 38''' has one leg 42 longer than the other, and in place of a washer as shown in FIG. 4, a headed bolt 44 is associated with the nut 26''' for striking the tuning fork and walls of the can. The sound waves emit through the slots 40.

In FIGS. 6 to 8, inclusive, yet another modified form of sound device 10a is shown. The sound device 10a is shown. The sound device 10a comprises a can 16a with a sidewall 18a is formed with a parallel slit 46, 46 defining tuning strips 48, 48, extending from one end of the can body to the other and the slits intersecting the beads 22a at the ends of the can, and intersecting the adjacent side portions of the bottom end wall 20a as indicated at 50, 50. A rectangular metal strip 52 is welded to the inside surface of the bottom end wall 20a as indicated at 54. A nut 26a and a headed screw 56 comprise the noise making articles for striking the tuning strips 48, 48 and the side and end walls of the can.

While I have illustrated and described the preferred embodiments of my invention it is to be understood that I do not limit myself to the precise construction herein disclosed and that various changes and modifications may be made within the scope of the invention as defined in the appended claims.

I claim:

1. A dog training device comprising a hollow cylindrical can closed at both ends and small loose metal articles inside the can adapted to strike the sides and ends of the can when the can is dropped on the floor or the like thereby causing a sound, the sidewall of the can is formed with horizontal corrugations on the sidewall thereof midway its ends, the top end of the can having spaced holes, and a tuning fork vertically disposed and secured to the inner surface of the end of the can, said articles comprising a washer and nut.

2. A dog training device comprising a hollow cylindrical can closed at both ends and small loose metal articles inside the can adapted to strike the sides and ends of the can when the can is dropped on the floor or the like thereby causing a sound, the sidewall of the can is formed with a series of elongated closed slots intermediate its ends, and a tuning fork vertically disposed and secured to he inner surface of one end of the can, one leg of the tuning fork being longer than the other, said articles comprising a nut and a headed bolt.

3. A dog training device comprising a hollow cylindrical can closed at both ends and small loose metal articles inside the can adapted to strike the sides and ends of the can when the can is dropped on the floor or the like thereby causing a sound, the can is formed with beads at the ends thereof, the sidewall of the can being formed with spaced parallel slots extending from end to end thereof and intersecting the beads, said slots defining elongated strips extending from end to end of the can, said strips serving as tuning strips, the articles comprising a nut and a headed screw.

4. A dog training device as defined in claim 3 and a reinforcing rectangular metal strip secured on the inner surface of one of the end walls of the can.